3,088,864
Patented May 7, 1963

3,088,864
POTASSIUM NITRATE AND KELP COMPOSITION
FOR TREATING PINKEYE
Russell E. Collins, 311 S. Market, Oskaloosa, Iowa
No Drawing. Filed Mar. 1, 1961, Ser. No. 92,474
7 Claims. (Cl. 167—53)

This invention relates to medical compositions and particularly to a medical composition to be fed to bovine animals.

The prevalence and severity of infectious bovine keratoconjunctivitis, commonly designated as pinkeye, remains a constant challenge to veterinary science. The disease occurs in all breeds, under all conditions of husbandry, and in all seasons. Treatment of the disease has been divided in recent years into two main categories, parenteral and local. In parenteral treatment, the use of non-specific proteins has reportedly been of some value. Mixed bacterins have also been tried, and vitamin A has been administered by intramuscular injection. For local treatment, sodium sulfacetamide, sulfathiazole, penicillin, chloramphenical, and the tetracyclines are now the drugs in most popular use. In spite of these types of treatment, the prevalence of the disease continues.

It is, therefore, an object of this invention to provide a novel medical composition adapted for parenteral treatment to prevent and to overcome bovine pinkeye.

It is a further object of this invention to provide a medical composition for the purpose specified, the elements of which are readily available, inexpensive, and easily and safely adapted to use.

Yet another object of this invention is to provide a novel medical composition for the above specified purpose which may readily be produced for animal feeding, and which may be easily mixed with granular salt for feeding to the animals.

These objects, and other features and advantages of this invention will become readily apparent from the following description.

As will be apparent from the following, the present invention contemplates a composition comprising potassium nitrate and seaweed, specifically kelp, which after being mixed, is added to granular salt for distribution to and consumption by the animals requiring treatment. The potassium nitrate may be used over a range of from one-half ounce to three ounces by weight, with two ounces being preferred, and the kelp may be used over a range of from four to twelve ounces by weight, with eight ounces preferred. Thus, the preferred mixture, by weight, of the composition is a one to four ratio of two ounces potassium nitrate with eight ounces of kelp. Whereas the preferred mixture provides the best therapeutic value under normal circumstances, any mixture within the range provides a therapeutic value of varying potency. This potency range is necessary to meet the various requirements for different animals and also the individual preferences of individual veterinarians or the like.

In preparing the composition, both the potassium nitrate and the kelp, which are commercially available in a granular form, are added together and then stirred and agitated until thoroughly and uniformly mixed. It is then preferred that the mixed composition be added as a whole to a quantity of granular salt suitable for animal consumption, the salt acting as the carrier. By adding the preferred mixture, by weight, of two ounces potassium nitrate and eight ounces kelp with approximately two hundred eighty-eight ounces by weight of dry granular salt, the combination can readily be mixed in a common gallon container or bucket. A medicated stock salt is thereby prepared comprising, by weight, approximately one hundred forty-four parts dry salt, one part potassium nitrate, and four parts kelp.

The preparation of the composition with the salt is administered to the animals by keeping it freely within their reach. Their natural craving for salt will cause them to take the medicated stock salt as demanded by their systems, and they thus obtain at the same time a proper amount of the medicinal composition calculated to cure the disease. The number of applications or the amount of the composition necessarily consumed to bring about an improvement varies, of course, due to the severity of the disease and other circumstances. Investigations and tests have shown that where animals began taking the medicinal composition when their pinkeye was at the weeping stage, improvement was noticed after ten to fourteen days. Where they began the treatment when eye lesions were visible, improvement occurred in three to four weeks.

I claim:
1. A medicinal composition for peroral treatment of pinkeye in bovine animals comprising a dry mixture of potassium nitrate and kelp.
2. A medicinal composition for peroral treatment of pinkeye in bovine animals comprising a dry mixture of potassium nitrate and kelp, wherein the quantity by weight of kelp is greater than that of potassium nitrate.
3. A medicinal composition for peroral treatment of pinkeye in bovine animals comprising, one part by weight of potassium nitrate mixed with four parts by weight of kelp.
4. A medicinal composition for peroral treatment of pinkeye in bovine animals comprising, one-half to three ounces by weight of potassium nitrate mixed with four to twelve ounces by weight of kelp.
5. A medicated stock salt for peroral treatment of pinkeye in bovine animals comprising, dry salt mixed with a composition of potassium nitrate and kelp.
6. A medicated stock salt for peroral treatment of pinkeye in bovine animals comprising, granulated salt mixed with a composition of one part by weight potassium nitrate and four parts by weight kelp.
7. A medicated stock salt for peroral treatment of pinkeye in bovine animals comprising, one hundred forty-four parts by weight granulated salt, one part by weight potassium nitrate, and four parts by weight of kelp.

References Cited in the file of this patent
UNITED STATES PATENTS
879,070    Duyke _____ Feb. 11, 1908

OTHER REFERENCES
Lewis: The Ophthalmic Formulary, 1942, p. 152, Charles C. Thomas, Springfield, Illinois.
King: American Dispensatory, 8th ed., 1870, Cincinnati, Ohio, p. 369.
Pearson: Diseases of the Horse, 1916, Government Printing Office, Washington, D.C., pp. 285–287.